| United States Patent | [15] | 3,647,371 |
|---|---|---|
| Kim et al. | [45] | Mar. 7, 1972 |

[54] METHOD FOR PREPARATION OF DICALCIUM PHOSPHATE

[72] Inventors: Keun Young Kim; Kenneth J. Shaver, both of St. Louis, Mo.

[73] Assignee: Monsanto Company, St. Louis, Mo.

[22] Filed: Aug. 7, 1968

[21] Appl. No.: 751,012

[52] U.S. Cl. .................................................23/108, 424/57
[51] Int. Cl. ........................................C01b 25/32, A61h 7/16
[58] Field of Search .......................................................23/108

[56] References Cited

UNITED STATES PATENTS

| 1,818,114 | 8/1931 | Carothers et al. | 23/108 |
| 2,209,967 | 2/1936 | Hooft | 23/108 |
| 2,697,024 | 12/1954 | Moss et al. | 23/108 |
| 3,464,786 | 9/1969 | Harnisch et al. | 23/108 |

*Primary Examiner*—Oscar R. Vertiz
*Assistant Examiner*—Hoke S. Miller
*Attorney*—Richard W. Sternberg, Roger R. Jones and Thomas N. Wallen

[57] ABSTRACT

Anhydrous dicalcium phosphate having an assay of at least 90 percent by weight and composed of particles, a major proportion of which have a particle size of from about 0.1 to 1.0 microns and a specific surface area of at least 10 square meters per gram is prepared by adding well dispersed, substantially dry calcium oxide or calcium hydroxide to phosphoric acid having a concentration of from about 40 to 80 percent $H_3PO_4$ by weight and maintaining the temperature of the reaction medium sufficiently high to provide dicalcium phosphate substantially free from water of crystallization. Dentifrice compositions containing this product provide effective polishing action without undue abrasion. Such compositions are prepared by direct blending of conventional dentifrice ingredients with an aqueous paste containing 45 to 65 percent by weight anhydrous dicalcium phosphate.

6 Claims, No Drawings

METHOD FOR PREPARATION OF DICALCIUM PHOSPHATE

BACKGROUND OF THE INVENTION

This invention relates to high-purity anhydrous dicalcium phosphate, hereinafter referred to as DCPA, composed of particles, a major proportion of which have a particle size of from about 0.1 to 1.0 microns and a specific surface area of at least 10 square meters per gram. Further, the invention relates to viscous aqueous slurries or pastes of such DCPA and to methods of making such DCPA and slurries thereof. Further, the invention relates to improved dentifrice compositions containing such DCPA as a polishing ingredient and to methods for making such compositions.

The term "anhydrous" is used herein to denote dicalcium phosphate substantially free from water of crystallization as distinguished from hydrates such as dicalcium phosphate dihydrate (DCPD). The term does not imply the absence of free water.

Commercially available DCPA hitherto known to the art is a product generally composed of particles having an average particle size, obtained by mechanical grinding, substantially greater than 1 micron—usually greater than 10 microns.

Although such DCPA provides effective polishing action in a dentifrice formulation when used to brush teeth, this polishing action is accompanied by a high degree of abrasion which often damages the tooth surface being polished. Prior to this invention it was generally believed by those skilled in the art that any DCPA capable of providing effective polishing action was also characterized by a high degree of abrasion.

SUMMARY OF THE INVENTION

It is an object of this invention to provide DCPA having an assay of at least 90 percent by dry weight, a major proportion of the DCPA being composed of particles having a particle size of from about 0.1 to about 1.0 microns and a specific surface area of at least 10 square meters per gram. Another object is to provide aqueous pastes containing 45–65 percent by weight of such DCPA. Another object is to provide methods of making such DCPA and DCPA pastes. Still another object is to provide improved dentifrice compositions containing such DCPA, and methods of making such dentifrice compositions.

The product of this invention is prepared by adding substantially dry calcium oxide or calcium hydroxide to aqueous phosphoric acid having a concentration of from about 40 to 80 percent $H_3PO_4$ by weight; the reaction temperature being maintained sufficiently high to ensure production of dicalcium phosphate substantially free from water of crystallization. The product formed is a viscous aqueous paste containing 45–65 percent by weight DCPA. This paste can be directly blended with conventional dentifrice ingredients such as flavorings, binders, and the like to prepare high polishing action, low-abrasion dentifrices.

The invention will be better understood from the following description of the preferred embodiments.

DESCRIPTION OF THE PREFERRED EMBODIMENTS

The reactants utilized for preparation of the product of this invention are calcium oxide or calcium hydroxide hereinafter referred to collectively or singly as calcium base, and phosphoric acid. The calcium base should be substantially dry. It is essential that the calcium base contain less than 15 percent free water (i.e. water other than water of hydration) to provide the product of this invention. The presence of greater amounts of free water results in the formation of products having a particle size substantially greater than 1 micron. To facilitate handling of the calcium base in the process it is especially preferred that the free water content be below about 5 percent by weight. In addition, at least about 80 percent by weight of the calcium base should be composed of particles having a particle size less than 100 microns. If a significant portion of the base is above 100 microns, the reaction time required to obtain a suitable product will be prolonged.

It is essential that the phosphoric acid utilized in the process has a concentration of at least 40 percent by weight $H_3PO_4$. If lower concentrations are used, major proportions of DCPA having a particle size substantially greater than 1 micron will be formed. The maximum concentration of acid which can be effectively utilized, is about 80 percent $H_3PO_4$. Higher acid concentrations result in reaction mediums too viscous to be efficiently agitated by conventional means. Acid concentrations of 40 to 60 percent by weight are particularly preferred.

In carrying out the process, calcium base must be added to the acid. This causes the reaction to take place in an acid medium thereby precluding the occlusion of unreacted calcium base in the product, which can result when acid is added to the calcium base. It is further desirable that the particulate calcium base be added in well-dispersed form. This can be conveniently accomplished by passing the calcium base through a screen to break up any agglomerates.

During addition of the calcium base, sufficient agitation is employed to provide a substantially homogeneous reaction medium.

Further, during the addition of calcium base, the temperature of the reaction medium is maintained sufficiently high to ensure the production of DCPA rather than DCPD. As is known, the transition temperature between DCPD and DCPA is ill defined and varies with conditions under which conversion is effected. However, a temperature sufficiently high to produce DCPA under a given set of reaction conditions can be readily determined by routine product analysis. The heat of the reaction generally provides a temperature sufficient to produce DCPA unless vigorous agitation conditions which rapidly dissipate reaction heat are employed. For example, when using a low-shear kneader-type mixer, a reaction medium temperature of 40° C. or greater will yield DCPA substantially free of DCPD.

Although there is no theoretical upper temperature limit, temperatures below the boiling point of the reaction medium are desirable in order to obviate the need for pressurized reaction and/or reflux apparatus.

Addition of calcium base is continued until the pH of the reaction medium is from about 5 to 8.5 preferably about 7. Higher or lower pH levels result in the presence of excess reactants or formation of higher or lower calcium phosphate products, for example, monocalcium phosphate or tricalcium phosphate. At this point, the reaction medium will be a viscous aqueous slurry or paste containing from 45 to 65 percent, preferably 45 to 55 percent by weight DCPA, a major proportion usually more than 90 percent by weight of which is composed of particles having a particle size of from 0.1 to 1.0 microns. The DCPA has an assay, based on dry weight of at least 90 percent and usually greater than 95 percent. The balance of the product is predominantly DCPD and higher calcium phosphates. The DCPA is preferably deflocculated, for example, by continuing the mixing and adding from 0.1 to 0.6 percent sodium tripolyphosphate based on the dry weight of anhydrous dicalcium phosphate product. Other well-known deflocculants including other polyphosphates such as sodium hexametaphosphate, and polysilicates, polycarboxylates, lignin derivatives such as lignosulphonates, protective colloids such as gums, polysaccharides and the like.

For optimum deflocculation, the pH of the reaction medium will be adjusted depending on the deflocculant used. For example, when sodium tripolyphosphate is used, the pH should be at least 6 but not above 8.5. The optimum pH range for other deflocculants can readily be determined by routine tests.

The DCPA produced by the process described is characterized by a number of distinguishing characteristics. As discussed above, the DCPA of this invention is composed of particles, a major proportion of which have a particle size, as determined by electron microscope, of from about 0.1 to 1.0 microns. By way of comparison it is noted that DCPA produced by conventional neutralization procedures generally has an average particle size in excess of 10 microns. A major proportion of the particles of the DCPA of this invention has a specific surface area as determined according to the method of Brunauer et al. J. Am.Chem.Soc. 60, 309 (1940) of at least 10 square meters per gram—generally about 15 to 18 square meters per gram. Conventional, commercially available DCPA generally has a specific surface area of only about 3 square meters per gram. Further the DCPA of this invention has an assay of at least 90 percent—generally above 98 percent by dry weight and is substantially free from soluble phosphates.

The DCPA of this invention has a dentin abrasion value as determined by the method of Grabenstetter et al., *Journal of Dental Research* 37, 1060 (1958), of about 50 to 150. By way of comparison, commercially available DCPA having a particle size of about 10 microns has a dentin abrasion value of from about 1,000 to 1,400. In dentifrice compositions the DCPA of this invention provides effective polishing action with little or no abrasive damage to tooth surfaces.

The DCPA is obtained from the above-described process in the form of an aqueous paste containing 45 to 65 percent by weight DCPA.

If desired, the paste can be dried and the DCPA powder incorporated into dentifrice compositions by conventional techniques. However, dentifrice compositions are more conveniently prepared by direct addition of conventional dentifrice ingredients to the aqueous paste of DCPA.

Dentifrice ingredients suitable for blending with the DCPA of this invention include but are not limited to: binders such as the natural and synthetic gums for example viscarin gum, gum arabic, gum tragacanth, gum karaya and substituted cellulose ethers such as methyl cellulose, carboxymethyl cellulose, and hydroxy ethyl cellulose; humectants such as glycerine, sorbitol, and other polyhydric alcohols; anticaries agents such as the water-soluble fluorides; sudsing agents such as the water-soluble alkyl and alkyl ether sulfonates; and flavorings and sweetening agents such as mints and saccharin. If desired, conventional polishing agents such as DCPA of larger particle size or DCPD can be utilized in addition to the DCPA of this invention.

When adding conventional dentifrice ingredients to the aqueous paste of DCPA it is preferable to premix the binder and humectant before adding these ingredients to the DCPA in order to avoid lump formation. Most desirably, any supplementary polishing agent such as DCPD will be blended with the DCPA paste and the remaining ingredients—all premixed—will then be added. Entrapment of air can be prevented by mixing the ingredients under vacuum.

Preferred embodiments of the invention are further illustrated by the following detailed examples.

EXAMPLE I

Anhydrous dicalcium phosphate was prepared as follows: Ca(OH)$_2$ containing less than 1 percent free water and having an average particle size less than 100 microns was dispersed through a 40 U.S. Standard mesh screen into phosphoric acid having an initial concentration of 50 percent H$_3$PO$_4$ by weight. The temperature of the reaction medium was maintained between 68° and 76° C. while agitating with a kneader-type mixer to provide a substantially homogeneous reaction medium. The addition of lime was continued until the pH reached about 6.9. The product was deflocculated by addition of 0.6 percent by weight (based on dry product weight) sodium tripolyphosphate while continuing the mixing.

The final product was a paste containing greater than 51 percent by weight solids, analyzing about 99 percent DCPA and about 1 percent DCPD. When dried, the particle size of the DCPA as determined by electron microscope, was found to be between 0.2 and 0.8 microns. The product specific surface area was about 16 square meters per gram. Dentin abrasion of the DCPA was 65. The foregoing product characteristics were determined by methods previously referenced.

EXAMPLE II

A toothpaste was prepared as follows:

A viscous aqueous paste containing 51 percent by weight DCPA was prepared according to the procedure of Example I. About 19 parts glycerine, 1.2 parts viscarin gum binder, 1.4 parts sodium lauryl sulfate and 1 part flavoring and sweetener were premixed and added to the kneader mixer containing about 70 parts of the DCPA paste. The ingredients were mixed for about 90 minutes. The toothpaste formed was of suitable viscosity to be transferred directly to conventional tubing machines. In tests conducted on dental surfaces, the paste exhibited a high polishing action with low abrasion.

Although this invention has been described by reference to specific embodiments, numerous modifications within the scope of the appended claims will be apparent to those skilled in the art.

What is claimed is:

1. A method of manufacturing anhydrous dicalcium phosphate having an assay of at least 90 percent by weight, at least 90 percent of said anhydrous dicalcium phosphate being composed of particles having a particle size of from about 0.1 to about 1.0 microns and a specific surface area of at least 10 square meters per gram said method comprising the steps of: (a) adding in well-dispersed form a calcium base selected from the group consisting of calcium oxide, calcium hydroxide, and mixtures thereof, said calcium base containing less than 15 percent by weight free water, to phosphoric acid having an initial concentration of from about 40 to 80 percent by weight H$_3$PO$_4$, (b) agitating the calcium base and the acid to provide a substantially homogeneous reaction medium during the addition of the calcium base to the acid, (c) maintaining the temperature of the reaction medium sufficiently high to provide dicalcium phosphate substantially free from water of crystallization and (d) continuing the addition of said calcium base to the acid until the pH of the reaction medium is from about 5 to 8.5.

2. The process of claim 1 wherein said calcium base is composed of particles, at least 80 percent by weight of said particles having a particle size less than 100 microns and said phosphoric acid has an initial concentration of from about 40 to 60 percent by weight H$_3$PO$_4$.

3. The process of claim 1 further comprising the step of deflocculating the anhydrous dicalcium phosphate by admixing therewith about 0.1 to 0.5 percent by weight deflocculating agent based on dry weight of anhydrous dicalcium phosphate.

4. The process of claim 3 wherein said deflocculating agent is sodium tripolyphosphate.

5. The process of claim 1 wherein said calcium base is calcium hydroxide.

6. The process of claim 5 wherein the temperature of the reaction medium is maintained at at least 40° C.

* * * * *

PO-1050
(5/69)

UNITED STATES PATENT OFFICE
CERTIFICATE OF CORRECTION

Patent No. __3,647,371__  Dated __March 7, 1972__

Inventor(s) __Keun Y. Kim and Kenneth J. Shaver__

It is certified that error appears in the above-identified patent and that said Letters Patent are hereby corrected as shown below:

Claim 1, lines 5 and 6, which read "to about 1.0 microns and a specific surface area of at least 10 square meters per gram said method comprising the steps of:" should read -- to about 1.0 microns, a specific surface area of at least 10 square meters per gram and a dentin abrasion value of about 50 to about 150, said method comprising the steps of: --.

Claim 3, lines 3 through 5, which read "therewith about 0.1 to 0.5 percent by weight deflocculating agent based on dry weight of anhydrous dicalcium phosphate" should read -- therewith about 0.1 to 0.5 percent by weight, based on dry weight of anhydrous dicalcium phosphate, of a deflocculating agent selected from the group consisting of polyphosphates, polysilicates, lignin derivatives and gums. --

Signed and sealed this 22nd day of August 1972.

(SEAL)
Attest:

EDWARD M. FLETCHER, JR.
Attesting Officer

ROBERT GOTTSCHALK
Commissioner of Patent